United States Patent
Noguchi

(10) Patent No.: US 7,620,649 B2
(45) Date of Patent: Nov. 17, 2009

(54) METHOD, APPARATUS, AND PROGRAM FOR DATA MANAGEMENT

(75) Inventor: Yukinori Noguchi, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 256 days.

(21) Appl. No.: 10/669,594

(22) Filed: Sep. 25, 2003

(65) Prior Publication Data

US 2005/0102252 A1 May 12, 2005

(30) Foreign Application Priority Data

Sep. 26, 2002 (JP) .............................. 2002-281513

(51) Int. Cl.
*G06F 7/00* (2006.01)
*G06F 17/00* (2006.01)

(52) U.S. Cl. .................................. 707/102; 707/104.1

(58) Field of Classification Search ...................... 707/1, 707/3, 100, 102, 200, 9, 104.1, 101, 203; 715/706, 500, 501.1; 369/83; 345/634; 382/100
See application file for complete search history.

(56) References Cited

U.S. PATENT DOCUMENTS

| | | | |
|---|---|---|---|
| 5,572,499 A | 11/1996 | Kohtani et al. | |
| 5,657,477 A | 8/1997 | Nonoshita et al. | |
| 5,708,825 A * | 1/1998 | Sotomayor ............... | 715/501.1 |
| 6,005,678 A | 12/1999 | Higashida et al. | |
| 6,192,191 B1 | 2/2001 | Suga et al. | |
| 6,385,330 B1 * | 5/2002 | Powell et al. ............... | 382/100 |
| 6,664,976 B2 * | 12/2003 | Lofgren et al. .............. | 345/634 |
| 7,092,969 B2 * | 8/2006 | Meek et al. ............... | 707/104.1 |
| 7,209,571 B2 * | 4/2007 | Davis et al. .................. | 382/100 |
| 2002/0010722 A1 | 1/2002 | Takayama | |
| 2002/0067500 A1 | 6/2002 | Yokomizo et al. | |
| 2002/0087536 A1 | 7/2002 | Ferguson | |
| 2004/0015479 A1 | 1/2004 | Meek et al. | |
| 2004/0051784 A1 * | 3/2004 | Ejima et al. ............ | 348/207.99 |
| 2007/0052730 A1 * | 3/2007 | Patterson et al. ............ | 345/634 |

FOREIGN PATENT DOCUMENTS

| | | |
|---|---|---|
| EP | 0 559 376 A1 | 9/1993 |
| EP | 0 753 852 A1 | 1/1997 |
| EP | 0 878 956 A1 | 11/1998 |
| JP | 2001-084354 A | 3/2001 |
| JP | 2002-57973 A | 2/2002 |
| WO | WO-01/16669 A2 | 3/2001 |

* cited by examiner

*Primary Examiner*—Don Wong
*Assistant Examiner*—Merilyn P Nguyen
(74) *Attorney, Agent, or Firm*—Birch, Stewart, Kolasch & Birch, LLP

(57) ABSTRACT

Original data and derivative data are managed securely and conveniently. A processing unit of a computer 1 whose IP address is J1 sends a file A as a file A1 to a Web server (whose URL is URL-100) of another computer 100, via the Internet. A file management unit generates accompanying information comprising link information "file A1, URL-100" and processing content information "copying" for the file A, and generates accompanying information comprising link information "file A, IP address J1" and processing content information "copied from file A" for the file A1. An attachment unit attaches the accompanying information to the files A and A1.

13 Claims, 4 Drawing Sheets

APPENDIX

METHOD, APPARATUS, AND PROGRAM FOR DATA MANAGEMENT

This Nonprovisional application claims priority under 35 U.S.C. § 119(a) on Patent Application No(s). 2002-281513 filed in Japan on Sep. 26, 2002, the entire contents of which are hereby incorporated by reference.

BACKGROUND OF THE INVENTION

1. Field of the Invention

The present invention relates to a method, an apparatus, and a program for data management by relating data.

2. Description of the Related Art

Various data management methods by relating data have been proposed. For example, master content and subordinate content may be determined so that a change in the master content can be reflected in the subordinate content. Furthermore, a system has been proposed for managing various content (U.S. Pat. No. 6,192,191). In this method, a management file stores information on a relationship among the content and the relationship can be known by referring to the management file.

Meanwhile, data (content) stored in a hard disc or the like of a computer are subjected to various kinds of processing carried out by a user, such as copying, manipulation, and image processing in the case of image data. Therefore, data sets generated from an original data set (hereinafter referred to as derivative data sets for distinction from the original data set) exist in many cases in one computer. When a user wishes to carry out some kind of processing on one of the data sets, the user needs to know a relationship between the data set and the other data sets. For example, in the case where the user wishes to delete one of the data sets, the user does not need to be anxious about deleting the data set if the user knows that the original data set of the data set to be deleted is stored. Furthermore, in the case where the user wishes to carry out processing that requires time and specialized knowledge (such as image processing on an image data set), if the user knows that a data set having been subjected to the same processing exists, the user simply uses the data set to save his/her time. In other words, clarifying the relationship between the original data set and the derivative data sets improves security and convenience for the user upon management of the data sets.

However, in the data management method using the relationship between master content and subordinate content described above, an original data set is lost although the change in the master content can be reflected in the subordinate content and integrity among the content can be maintained. For example, if one of image data sets as the master content is subjected to color conversion processing, image data sets as the subordinate content can also be subjected to the color conversion processing, and the original data set is changed. Therefore, if another type of image processing such as gradation conversion processing or density conversion processing needs to be carried out on the original data set, the desired data set cannot be obtained, since the original data set has been lost due to the color conversion processing. In order to solve this problem, in the case where a user needs to carry out processing on master content, the user needs to copy an original data set to be stored, which is troublesome for the user. Moreover, in the case where subordinate content is subjected to some kind of processing, a change caused by the processing is not reflected in master content. Therefore, a state of the subordinate content is not known when the master content is referred to. Consequently, a user needs to memorize which content is master or subordinate, which is also troublesome.

In the case where the management file is used for managing the relationship among the content, if a user wishes to carry out some kind of processing thereon, the user needs to refer to the management file, which is inconvenient. Furthermore, since the management file is dependent on a system, management of the content can only be carried out in one system in this method. Therefore, although a relationship among content stored in one computer can be managed, if a portion of the content is copied and stored in another computer, the computer storing the copied content cannot trace back the original content by using the copied content.

SUMMARY OF THE INVENTION

The present invention has been conceived based on consideration of the above circumstances. An object of the present invention is therefore to provide a method, an apparatus, and a program for managing data with security and convenience.

A data management method of the present invention is a method of managing original data and derivative data generated through editing processing on the original data, by relating the original data and the derivative data. The data management method comprises the steps of:

generating link information for linking the original data and the derivative data and editing information representing the content of the editing processing; and attaching the link information and the editing information to the original data and the derivative data as accompanying information thereof.

A data management apparatus of the present invention is an apparatus for managing original data and derivative data generated through editing processing on the original data, by relating the original data and the derivative data. The data management apparatus comprises:

accompanying information generation means for generating accompanying information comprising link information for linking the original data and the derivative data and editing information representing the content of the editing processing; and accompanying information attaching means for attaching the accompanying information generated by the accompanying information generation means to the original data and the derivative data.

A program of the present invention is a program for causing a computer to execute a process of managing original data and derivative data generated through editing processing on the original data, by relating the original data and the derivative data. The program comprises the steps of:

generating link information for linking the original data and the derivative data and editing information representing the content of the editing processing; and attaching the link information and the editing information to the original data and the derivative data as accompanying information thereof.

The editing processing refers to processing for generating the derivative data from the original data. More specifically, the editing processing refers to copying for generating the derivative data that have exactly the same content as the original data, processing for obtaining the derivative data by modifying the original data, and image processing on the original data in the case where the original data are image data, for example. The copying processing includes processing for sending the original data from a system in which the original data are stored to another system, since the data sent in this manner can be thought of as the derivative data having the same content as the original data. Therefore, the copying processing includes processing for sending the original data from a computer having the original data to another computer connected to the computer via a network or by serial connection. The network refers to a LAN or a WAN such as the Internet.

The link information refers to information that enables a user to refer to either the original data or the derivative data, directly or indirectly from the other data. For example, if the link information of the original data includes the name of the derivative data and a location thereof, the user can refer to the derivative data by using the link information. In this case, the user can refer to the derivative data in a direct manner. Furthermore, if the link information of the original data includes information of the name of the derivative data and a pointer indicating a location thereof (the URL of the derivative data in the case where the derivative data are stored in a Web server, for example), the user can refer to the derivative data by an operation such as clicking on the pointer, without memorizing the name and the location of the derivative data. In this case, the user can refer to the derivative data in an indirect manner.

A method of attaching the accompanying information to the original data and to the derivative data can be any method, as long as the accompanying information can be referred to from the original data and from the derivative data. For example, the accompanying information may be described in header information of the original data and the derivative data, or as tag information of the original data and the derivative data if the original data and the derivative data are image data. The accompanying information generated according to an XML may also be written in a predetermined area of the original data and the derivative data.

The present invention can also be applied to the case where other derivative data (referred to as a data set 3) are generated by some editing processing on the derivative data (referred to as a data set 2) generated from the original data (referred to as a data set 1). In this case, the data set 2 is the original data for the data set 3, and the accompanying information for the data set 2 and for the data set 3 is generated and attached thereto. The data set 1 can also be the original data for the data set 3. Therefore, the accompanying information for the data set 1 and for the data set 3 is preferably generated and attached thereto. If the editing information for the data set 3 in this case includes the content of the editing processing whereby the data 2 was obtained from the data 1 and the content of the editing processing whereby the data set 3 was obtained from the data set 2, history of the editing for obtaining the data sets 3 can be known by referring to the accompanying information of the data set 1. Alternatively, the editing information of the data set 3 may include only the content representing the editing processing carried out on the data set 2 so that the history can be known by referring to the accompanying information of the data set 1 and the data set 2.

In the case where the derivative data (referred to as a data set 5 and a data set 6) are obtained by carrying out various types of editing processing on the original data (referred to as a data set 4), the accompanying information is preferably generated for and attached to a pair of the data sets 4 and 5 and for a pair of the data sets 4 and 6. In addition, the accompanying information for a pair of the data sets 5 and 6 is also generated and attached thereto. In this manner, without referring to the data set 4, existence of the other derivative data set is known with reference to the accompanying information of one of the derivative data sets.

According to the data management method and the data management apparatus of the present invention, the accompanying information is generated for the original data and the derivative data generated by carrying out the editing processing on the original data, to include the link information that links the original data and the derivative data and the editing information representing the content of the editing processing carried out on the original data at the time of generation of the derivative data. The accompanying information is then attached to the original data and to the derivative data. Therefore, by referring to the accompanying information of either the original data or the derivative data to be paired, existence of the other data is known in addition to a property thereof (such as the content of the editing processing and whether the data are the original or the derivative data). In this manner, the data can be managed securely and conveniently. For example, if data are to be deleted, it becomes known with reference to the accompanying information thereof whether the data have been generated as a copy of original data or by carrying out editing processing on the original data, which leads to easier judgment regarding deletion of the data.

Furthermore, in the case where time-consuming editing processing such as image processing is going to be carried out on original data, whether or not derivative data have been generated through the same image processing can be known by referring to the accompanying information of the data to be processed. In this case, if the derivative data exist, the derivative data can be used instead of the original data, which saves time and improves efficiecy.

The program of the present invention can realize execution of the data management method of the present invention by being installed in a computer.

DESCRIPTION OF THE PREFERRED EMBODIMENT

Hereinafter, an embodiment of the present invention will be explained with reference to the accompanying drawings.

Figure 1:
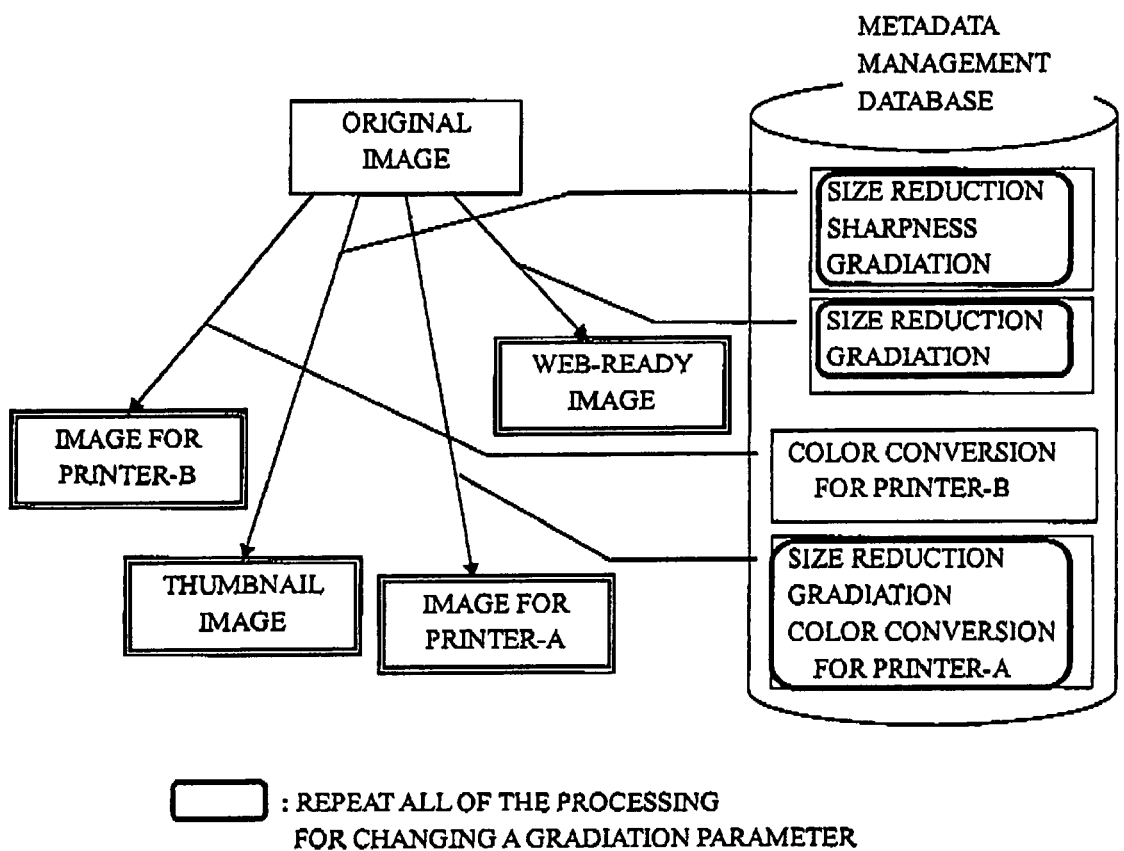
FIG. 1 is a block diagram showing the configuration of a file system as an embodiment of the present invention.

FIG. 1 is a block diagram showing the configuration of a file system as the embodiment of the present invention. The file system shown in FIG. 1 comprises a computer 1 and a computer 100. The computers 1 and 100 are connected to each other via the Internet 30. The computer 1 has a global IP address "J1". For the sake of simpler explanation, image files are used as data sets to be managed in this embodiment.

Figure 2:
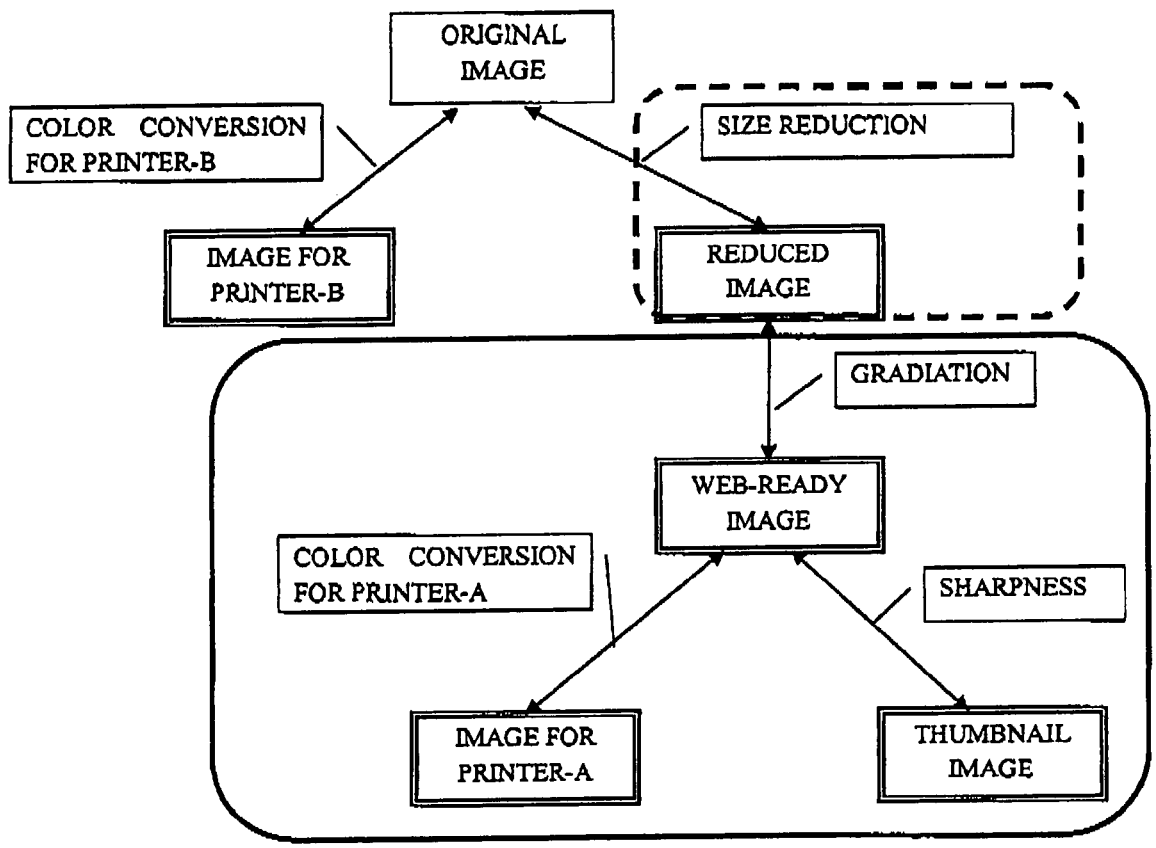
FIGS. 2A and 2B are block diagrams showing the configuration of a computer 1 shown in FIG. 1.

FIGS. 2A and 2B are block diagrams showing the configuration of the computer 1. As shown in FIG. 2A, the computer 1 comprises a storage unit 10 for storing the image files, a processing unit 15, and a file management unit 20. The processing unit 15 comprises application software and hardware for processing the image files according to an instruction to process the image files that is input from an external input device such as a mouse and a keyboard. The file management unit 20 manages the image files processed by the processing unit 15. The file management unit 20 has a program of the present invention installed therein, and the configuration thereof is shown in FIG. 2B. As shown in FIG. 2B, the file management unit 20 comprises an accompanying information generation unit 25 for generating accompanying information to be attached to any one of the image files that is processed by the processing unit 15 (that is, to an original file) and to the image file after the processing (that is, to a derivative file), and an attachment unit 26 for attaching the accompanying information generated by the accompanying information generation unit 25 to the original file and the derivative file. The accompanying information generation unit 25 comprises a link information generation unit 21 for generating link information to link the original file and the derivative file, and processing content information generation means 22 for generating information representing the content of the processing carried out at the time of generation of the derivative file.

The link information generation means 21 generates information representing the file name and a location of the derivative file as the link information for the original file. At the same time, the link information generation unit 21 generates information representing the file name and a location of the original file as the link information for the derivative file. The processing content information generation unit 22 generates the information on the content of the processing carried out at the time of generation of the derivative file. The link information and the processing content information are paired in the accompanying information of each of the files.

The computer 100 has a Web server that is not shown, for storing the image files uploaded from the computer 1. The address of the Web server is "URL-100".

The operation of the file system in this embodiment will be explained with reference to FIG. 3.

Figure 3:
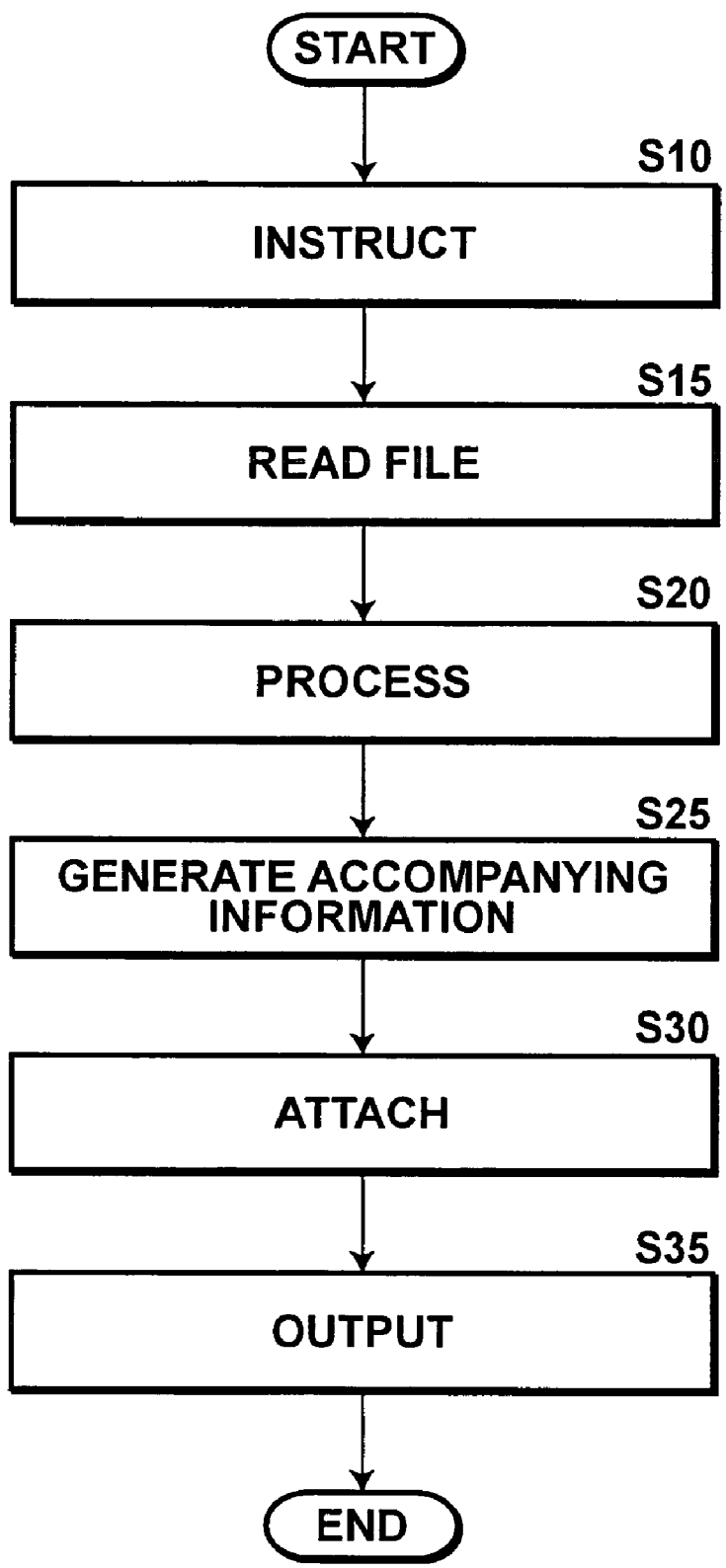
FIG. 3 is a flow chart showing the operation of the computer 1.

FIG. 3 is a flow chart showing the operation of the computer 1 in the file system. As shown in FIG. 3, the operation of the computer 1 is started by an instruction input from a user to the processing unit 15 (Step S10). In this explanation, copying processing is used as an example of the processing, and the user instructs the computer 1 to send a file A stored in the storage unit 10 to the Web server of the computer 100. The processing unit 15 reads the file A from the storage unit 10 according to the instruction, and stores the file A in a memory that is not shown (Step S15). The file A is then copied (step S20) to generate a copy file (hereinafter referred to as a file A1). The accompanying information generation unit 25 of the file management unit 20 generates the accompanying information comprising the link information "file A1, URL-100", and the processing content information representing the processing "copying", for the file A as the original file. At the same time, the accompanying information generation unit 25 generates the link information "file A, IP address J1", and the processing content information representing the processing "copied from file A", for the file A1 as the derivative file (Step S25). The attachment unit 26 attaches the accompanying information generated by the accompanying information generation unit 25 to the files A and A1 (Step S30). The processing unit 15 outputs the file A attached with the accompanying information to the storage unit 10, and overwrites the file A. The processing unit 15 also sends the copy file (the file A1) to the Web server of the computer 100 (Step S35).

Figure 4:
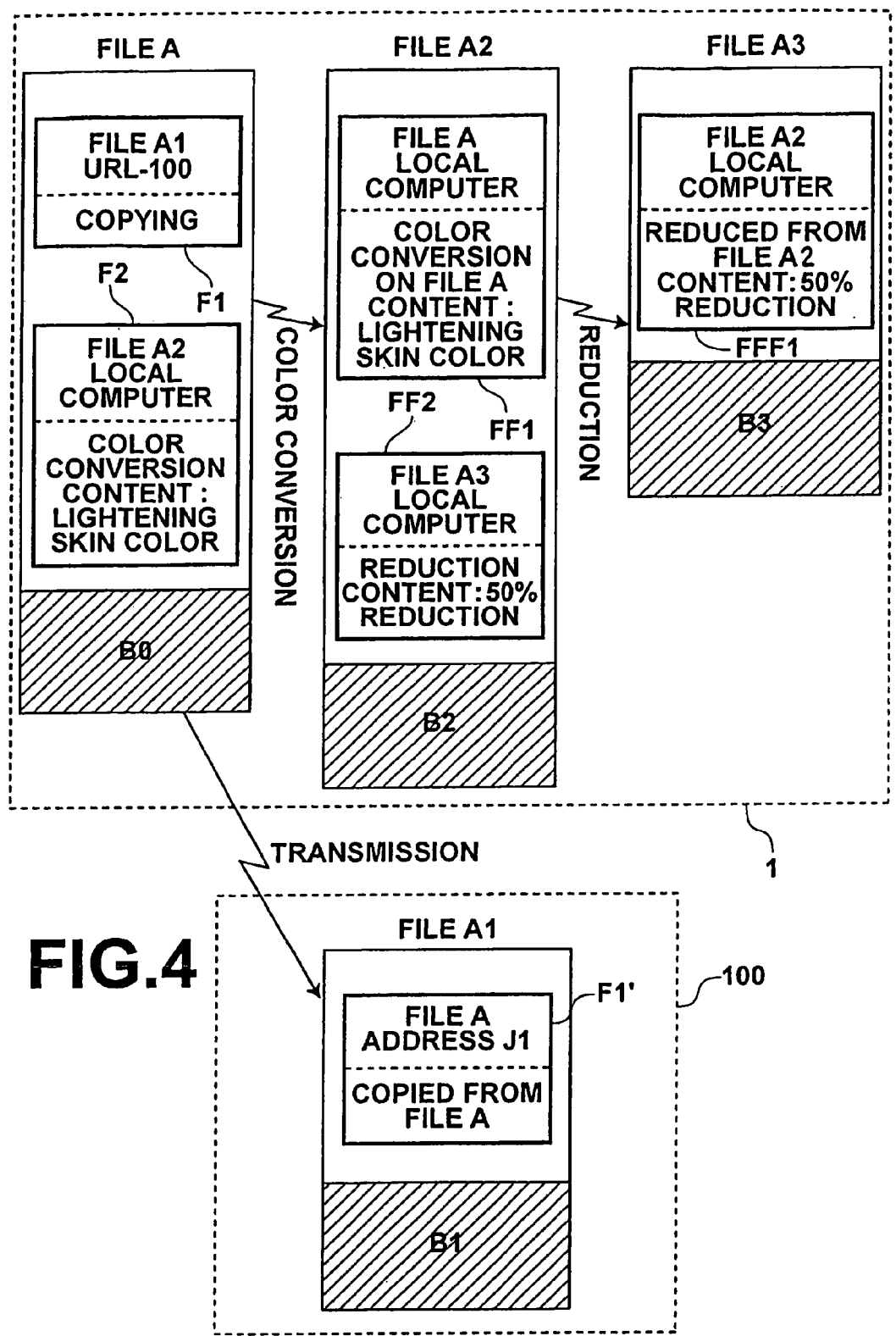
FIG. 4 shows an example of a file structure comprising an original file and files generated from the original file.

FIG. 4 shows a file structure comprising the original file (the file A) and the derivative files thereof generated from various kinds of processing on the original file. In this example, the file A is sent to the Web server of the computer 100 to be stored as the file A1, and a file A2 is generated from processing of color conversion on the file A. Reduction processing on the file A2 generates a file A3. As shown in FIG. 4, when the file A is sent to the computer 100, the accompanying information (hereinafter referred to as accompanying information F1) of the file A is generated, comprising the link information "file A1, URL-100", and the processing content information representing "copying". Therefore, the accompanying information F1 indicates the fact that the file A1 generated from the file A was sent to URL-100. At the same time, the accompanying information of the file A1 (hereinafter referred to as accompanying information F1') sent to and stored in the computer 100 comprises the link information "file A, IP address J1", and the processing content information representing "copied from the file A". Therefore, the accompanying information F1' of the file A1 represents the fact that the file A1 was generated by copying the file A in the computer having the IP address J1. Since the file A1 is a copy of the file A, the content (referred to as B1 in FIG. 4) of the file A1 is the same as the content (referred to as B0 in FIG. 4) of the file A.

The file A2 is generated from the color conversion processing on the file A, and stored in the storage unit 10 of the computer 1. Therefore, the accompanying information of the file A (hereinafter referred to as accompanying information F2) comprises the link information "file A2, local computer" and the processing content information "color conversion, the content: lightening skin color". The accompanying information F2 thus represents the fact that the file A2 generated by color conversion whose content is skin color lightening is stored in the computer 1. At the same time, the accompanying information of the file A2 (hereinafter referred to as accompanying information FF1) comprises the link information "file A, local computer", and the processing content information "color conversion on the file A, the content: lightening skin color". The accompanying information FF1 represents the fact that the file A2 was generated by color conversion whose content was skin color lightening on the file A in the computer 1. The content of the file A2 (referred to as B2 in FIG. 4) is obtained by the color conversion according to skin color lightening on the content B0 of the file A.

The file A3 is generated by reduction processing on the file A2, and stored in the storage unit 10 of the computer 1. Therefore, the file A2 is the original file for the file A3. The accompanying information of the file A2 (hereinafter referred to as accompanying information FF2) is generated, comprising the link information "file A3, local computer", and the processing content information "reduction, the content: 50% reduction". The accompanying information FF2 therefore represents the fact that the file A3 generated by the reduction processing whose content is 50% reduction on the file A2 is stored in the computer 1. At the same time, the accompanying information of the file A3 (hereinafter referred to as accompanying information FFF1) generated by the reduction processing and stored in the computer 1 comprises the link information "file A2, local computer" and the processing content information "reduced from the file A2, the content: 50% reduction". Therefore, the accompanying information FFF1 represents the fact that the file A3 was generated by the reduction processing whose content was 50% reduction on the file A2 stored in the computer 1. The content (referred to as B3 in FIG. 4) of the file A3 is generated by the reduction processing whose content is 50% reduction on the content B2 of the file A2.

As has been described above, in the computer 1 in the file system in this embodiment, the accompanying information is generated to represent the relationship between the original file and the derivative files generated from the processing on the original file. The accompanying information is attached to the original file and the derivative files. Therefore, by referring to the accompanying information, it is known whether the file having the accompanying information is the original file or the file generated through the processing on the original, what kind of processing was carried out on the original file, and whether or not a file desired by the user (such as the file generated by color conversion) has been generated from the file, for example. In this manner, the data can be managed securely and conveniently. Furthermore, since the link information and the processing content information (the editing information) is attached to the files, a file dedicated to data management is not necessary, and the relationship between the original file and the derivative files is known even if the derivative files are stored in a system separated from a system storing the original file.

Although a preferred embodiment of the present invention has been explained above, the present invention is not necessarily limited to the embodiment described above, and various modifications can be made thereto within the scope of the present invention.

For example, in the file system described above, when the derivative file is generated, the accompanying information is generated for the direct pair of the original file and the derivative file. More specifically, when the file A2 is generated through the color conversion processing on the file A, the accompanying information is generated for the file A and the file A2. Likewise, the accompanying information is generated for the pair of the file A2 and the file A3 when the file A3 generated from the reduction processing on the file A2. However, when the accompanying information FF2 and FFF1 is generated for the pair of the files A2 and A3 at the time of generation of the file A3 through the reduction processing on the file A2, the accompanying information may also be generated for the file A for representing the fact that the file A3 generated from the file A2 is stored in the computer 1 or the file A3 generated from the 50% reduction processing on the file obtained by color conversion processing of lightening skin color on the file A is stored in the computer 1.

The data management method of the present invention may be provided as a program that causes a computer to execute the method. The program may be provided recorded on a computer readable storage medium. A skilled artisan would know that computer readable storage media are not limited to any specific type of storage device and include any kind of device, including but not limited to: CD's, floppy disks, RAM's, ROM's, hard disks, magnetic tapes, and internet downloads, in which computer instructions can be stored and/or transmitted. Transmission of the computer code through a network or through wireless transmission means is alos within the scope of this invention. Additionally, computer code/instructions include, but are not limited to: source, object, and executable code, and can be in any language including higher level languages, assembly language, and machine language.

What is claimed is:

1. A data management method for managing original data, first derivative data which is generated through editing processing on the original data, and second derivative data which is generated through editing processing on the first derivative data, by relating the original data, the first derivative data, and the second derivative data, the data management method comprising the steps of:
   generating first link information for linking the original data and the first derivative data and first editing information representing the content of the editing processing on the original data;
   attaching the first link information and the first editing information to the original data as first accompanying information thereof;
   generating first reverse link information for linking the first derivative data and the original data and the first editing information representing the content of the editing processing on the original data;
   attaching the first reverse link information and the first editing information to the first derivative data as second accompanying information thereof;
   generating second link information for linking the first derivative data and the second derivative data and second editing information representing the content of the editing processing on the first derivative data;
   attaching the second link information and the second editing information to the first derivative data third accompanying information thereof;
   generating second reverse link information for linking the second derivative data and the first derivative data and second editing information representing the content of the editing processing on the first derivative data; and
   attaching the second reverse link information and the second editing information to the second derivative data as fourth accompanying information thereof.

2. The data management method, as defined in claim 1, wherein
   the first accompanying information is inseparably attached to the original data;
   the second and third accompanying information are inseparably attached to the first derivative data; and
   the fourth accompanying information is inseperably attached to the second derivative data.

3. The data management method, as defined in claim 1, wherein the editing processing includes at least one of:
   copying to generate the first derivative data that have exactly the same content as the original data;
   copying to generate the second derivative data that have exactly the same content as the first derivative data;
   processing to obtain the first derivative data by modifying the original data;
   processing to obtain the second derivative data by modifying the first derivative data;
   image processing on the original data to generate the first derivative data in the case where the original data are image data; and
   image processing on the first derivative data to generate the second derivative data in the case where the first derivative data are image data.

4. The data management method, as defined in claim 3, wherein the copying to generate the first derivative data includes not only a process for sending the original data from a computer having the original data to another computer, but also a process for sending the first derivative data from a computer having the first derivative data to another computer.

5. The data management method, as defined in claim 4, wherein the computer having the original data is connected to the other computer to which the original data is sent through one of a network and a serial connection and the computer having the first derivative data is connected to the other computer to which the first derivative data is sent through one of the network and the serial connection.

6. The data management method, as defined in claim 5, wherein the network includes one of a LAN and a WAN such as the Internet.

7. The data management method, as defined in claim 1, wherein the first link information is information that enables a user to directly or indirectly refer to the first derivative data from the original data and the first reverse link information is information that allows a user to directly or indirectly refer to the original data from the first derivative data, and the second link information is information that enables a user to directly or indirectly refer to the second derivative data from the first derivative data and the second reverse link information is information that allows a user to directly or indirectly refer to the first derivative data from the second derivative data.

8. The data management method, as defined in claim 7, wherein the first link information attached to the original data includes the name of the first derivative data, and wherein the first link information attached to the original data further includes at least one of a location of the first derivative data and a pointer indicating the location thereof;

the first reverse link information attached to the first derivative data includes the name of the original data, and wherein the first reverse link information attached to the first derivative data further includes at least one of a location of the original data and a pointer indicating the location thereof;

the second link information attached to the first derivative data includes the name of the second derivative data, and wherein the second link information attached to the first derivative data further includes at least one of a location of the second derivative data and a pointer indicating the location thereof; and the second reverse link information attached to the second derivative data includes the name of the first derivative data, and wherein the second reverse link information attached to the second derivative data further includes at least one of a location of the first derivative data and a pointer indicating the location thereof.

9. The data management method, as defined in claim 8, wherein the pointer is the URL of:

the original data in the case where the original data are stored in a Web server;

the first derivative data in the case where the first derivative data are stored in a Web server; and the second derivative data in the case where the second derivative data are stored in a Web server.

10. The data management method, as defined in claim 1, wherein the first accompanying information is attached to the original data by using one of a method of describing the first accompanying information in the header information in the original data, a method of describing the first accompanying information in tag information of the original data if the original data and the first derivative data are image data, and a method of writing the first accompanying information generated according to XML in a predetermined area of the original data, and the second accompanying information is attached to the first derivative data by using one of a method of describing the second accompanying information in the header information of the first derivative data, a method of describing the second accompanying information in information of the first derivative data if the original data and first derivative data are image data, and a method of writing the second accompanying information generated according to XML in a predetermined area of the first derivative data;

the third accompanying information is attached to the first derivative data by using one of a method of describing the third accompanying information in the header information of the first derivative data, a method of describing the third accompanying information in tag information the first derivative data if the first derivative data and second derivative data are image data, and a method of writing the third accompanying information generated according to XML in a predetermined area of the first derivative data; and the fourth accompanying information is attached to the second derivative data by using one of a method of describing the fourth accompanying information in the header information of the second derivative data, a method of describing the fourth accompanying information in tag information of the second derivative data if the first derivative data and second derivative data are image data, and a method of writing the fourth accompanying information generated according to XML in a predetermined area of the second derivative data.

11. The data management method, as defined in claim 1, further comprising the steps of:

generating third link information for linking the original data and said second derivative data and third editing information representing the content of the editing processing to generate said second derivative data from the original data, and attaching the third link information and the third editing information to the original data and said second derivative data as third accompanying information thereof.

12. A data management apparatus for managing original data, first derivative data which is generated through editing processing on the original data, and second derivative data which is generated through editing processing on the first derivative data, by relating the original data, the first derivative data, and the second derivative data, the data management apparatus comprising:

a storage unit;

a processing unit; and a file management unit having a program directing carrying out the steps of:

generating first link information for linking the original data and the first derivative data and first editing information representing the content of the editing processing on the original data;

attaching the first link information and the first editing information to the original data as first accompanying information;

generating first reverse link information for linking the first derivative data and the original data and the first editing information representing the content of the editing processing on the original data;

attaching the first reverse link information and the first editing information to the first derivative data as second accompanying information thereof;

generating second link information for linking the first derivative data and the second derivative data and second editing information representing the content of the editing processing on the first derivative data;

attaching the second link information and the second editing information to the first derivative data as third accompanying information thereof;

generating second reverse link information for linking the second derivative data and the first derivative data and second editing information representing the content of the editing processing on the first derivative data; and attaching the second reverse link information and the second editing information to the second derivative data as fourth accompanying information thereof.

13. A computer readable recording medium storing thereon a program for causing a computer to execute steps of managing original data, first derivative data which is generated through editing processing on the original data, and second derivative data which is generated through editing processing on the first derivative data, by relating the original data, the first derivative data, and the second derivative data, the program comprising the steps of:

generating first link information for linking the original data and the first derivative data and first editing information representing the content of the editing processing on the original data;

attaching the first link information and the first editing information to the original data as first accompanying information thereof;

generating first reverse link information for linking the first derivative data and the original data and the first editing information representing the content of the editing processing on the original data;

attaching the first reverse link information and the first editing information to the first derivative data as second accompanying information thereof;

generating second link information for linking the first derivative data and the second derivative data and second editing information representing the content of the editing processing on the first derivative data;

attaching the second link information and the second editing information to the first derivative data as third accompanying information thereof;

generating second reverse link information for linking the second derivative data and the first derivative data and second editing information representing the content of the editing processing on the first derivative data; and attaching the second reverse link information and the second editing information to the second derivative data as fourth accompanying information thereof.

* * * * *